United States Patent [19]

Wasser

[11] 4,226,268

[45] Oct. 7, 1980

[54] FUNNEL

[75] Inventor: Norbert Wasser, Cologne, Fed. Rep. of Germany

[73] Assignee: Walther & Cie Aktiengesellschaft, Koeln-Dellbrueck, Fed. Rep. of Germany

[21] Appl. No.: 966,315

[22] Filed: Nov. 29, 1978

[30] Foreign Application Priority Data

Dec. 2, 1977 [DE] Fed. Rep. of Germany ....... 2753712

[51] Int. Cl.[3] ........................ B67C 11/00; B01D 23/28

[52] U.S. Cl. ............................ 141/331; 113/116 DD; 141/286; 228/182

[58] Field of Search ............... 141/331, 345, 297, 300, 141/199, 205, 286; 29/155 R, 155 C; 113/116 DD, 116 W; 228/1, 82

[56] References Cited

U.S. PATENT DOCUMENTS

| | | | |
|---|---|---|---|
| 850,126 | 4/1907 | Bayley | 141/331 X |
| 1,037,099 | 8/1912 | York | 29/155 C |

FOREIGN PATENT DOCUMENTS

| | | | |
|---|---|---|---|
| 503462 | 7/1930 | Fed. Rep. of Germany | 141/297 |
| 18302 | of 1896 | United Kingdom | 141/331 |

*Primary Examiner*—William D. Martin, Jr.
*Attorney, Agent, or Firm*—Michael J. Striker

[57] ABSTRACT

A funnel includes an upper portion which comprises at least two separate parts separably connected to each other so as to define a first interior and lower portion defining a second interior. The first and lower portions are sealingly and separably connected to each other so that the first and second interiors thereof define together the interior of the funnel.

12 Claims, 4 Drawing Figures

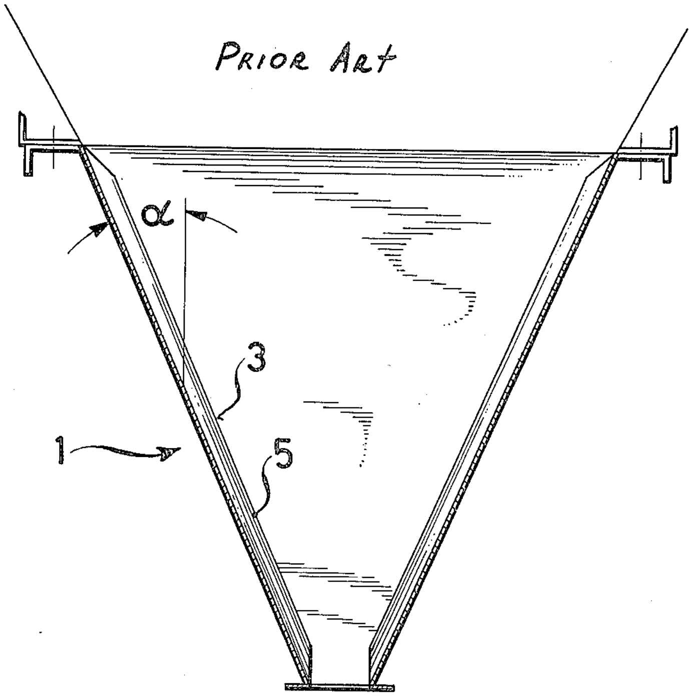
FIG.1
FIG. 2
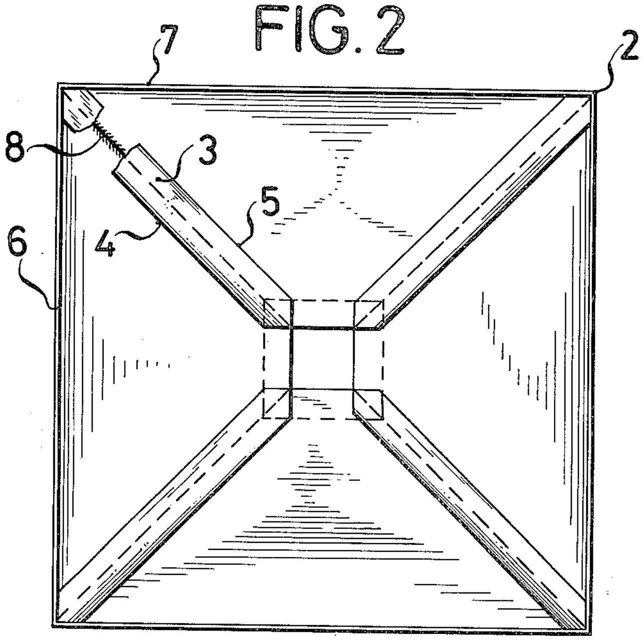
Prior Art

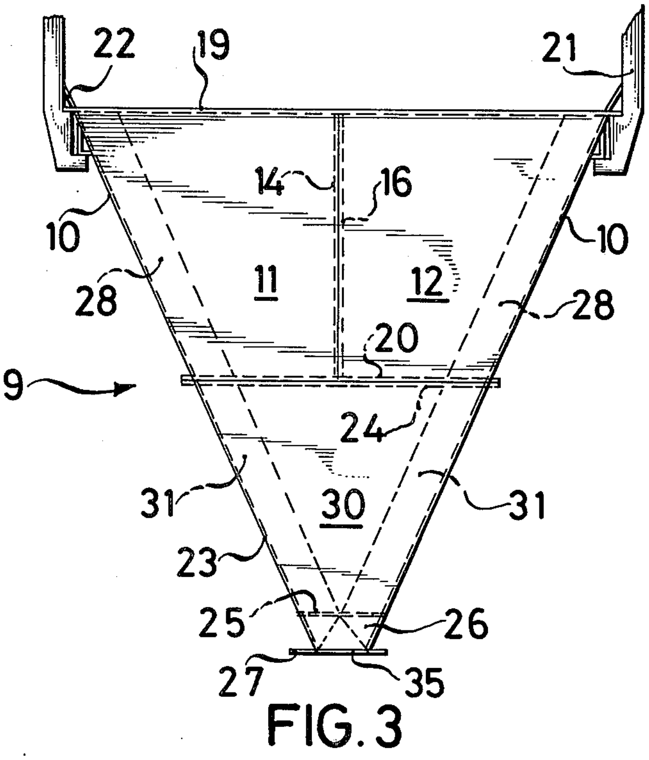
FIG. 3
FIG. 4
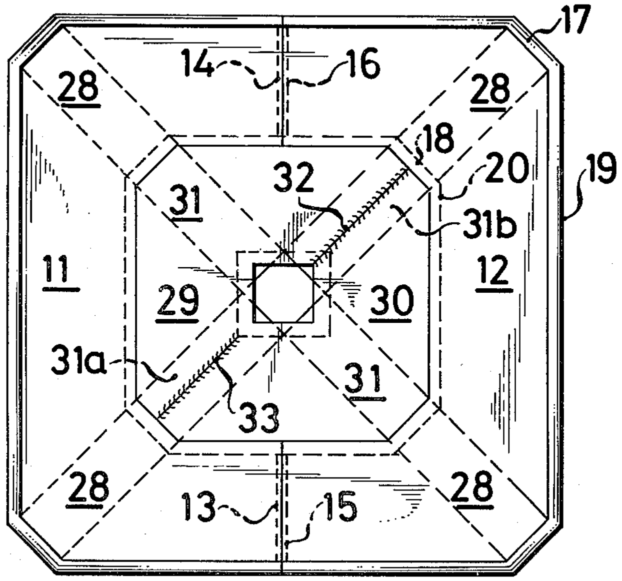

FUNNEL

BACKGROUND OF THE INVENTION

The present invention relates to dust filters.

More particularly the present invention concerns a funnel for collecting dust separated by a filter.

It is known in the prior art to provide a gas-filtering system with a collecting funnel for leading dust separated by a filter to an arrangement for transporting the thusly collected dust away from the filter.

The separated dust tends to create a cake in such a funnel, which can result in plugging the same. In this case the interior of the funnel eventually may become extremely obstructed so that no dust will leave this funnel through the corresponding outlet thereof. In order to decrease the dust accumulation tendency it is known to provide the inside wall of the funnel with a low-friction covering to thereby facilitate sliding of the dust through the funnel. Obviously this low friction covering is quite expensive. However, crystalline dust considerably abrades this covering, making the latter practically inefficient.

It has been recognized, that the dust, especially fine-grain dust has a tendency to accumulation, especially along welded joints of the funnel. Such dust deposits can eventually result in plugging the outlet of the funnel. Therefore, the welded joints which connect the walls of the funnel must be very carefully polished. In the case of a rectangular funnel, it is especially likely that the dust will deposit along the connecting angles of the funnel walls. In order to prevent dust deposit process along these angles it is preferable to provide the funnel with the most possible inclination. Such a feature will obviously lead to increasing the overall height of the funnel, which involves additional expenses. Moreover, in order to further prevent dust accumulation, the angle portions of the funnel have to be covered with sheets. However, the additional sheets involve additional welded joints and consequently additional polishing operations of these welded joints.

SUMMARY OF THE INVENTION

It is a general object of the present invention to avoid the disadvantages of the prior art funnels.

More particularly, it is an object of the present invention to provide such a funnel which will prevent dust accumulation.

Another object of the present invention is to provide an inexpensive and still reliable funnel.

In pursuance of these objects and others which will become apparent hereafter, one feature of the present invention resides in providing a funnel comprising an upper portion having at least two separate parts separably connected to each other so as to define a first interior, a lower portion which defines a second interior and means for sealingly and separably connecting said upper and lower portions to each other so that said first and second interiors thereof define together the interior of the funnel.

It is to be understood that the separate portions and parts of the funnel in accordance with the present invention may be transported to an assembly site separately in order to be connected right there. This fact is especially advantageous in the case of extra-high funnels. Obviously, it is very difficult to manipulate with the prior art one-piece funnels at the assembly site. In the case of the present invention the separate parts and portions of the funnel can very easily be moved from one place to another, which is very convenient during assembling of the funnel.

In accordance with another advantageous feature of the present invention the separate parts and portions of the funnel are screwed to one another. In order to seal the connecting joints of such a funnel they may be additionally welded to one another.

In order to increase the stability of the funnel the latter is provided with outer reinforcing ribs. Some of these reinforcing ribs may be shaped as flanges which are used when the funnel is assembled on the assembly site.

The usual covering sheets may be eliminated if the angle portions of the funnel are flattened to thereby define inclined surfaces correspondingly.

In accordance with the preferable embodiment of the present invention these surfaces at the outlet of the funnel are turned by an angle of 90° relative to the inlet of the funnel.

Thus, the width of the inclined surfaces at the outlet of the funnel corresponds to that at the upper portion of the funnel.

The lower portion may also comprise two separate identical sheet parts. In this case these identical sheet parts may be welded to each other along the middle of the inclined surfaces. In this case, such a funnel will have only two welded joints which have to be polished as opposed to at least four of the prior art funnels. Besides that, such a funnel does not need any covering sheets to cover the welded joints of the lower portion.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWINGS

FIG. 1 is a sectional view of a prior-art funnel;

FIG. 2 is a top view of the prior-art funnel shown in FIG. 1;

FIG. 3 is a sectional view of a funnel in accordance with the present invention; and FIG. 4 is a top view of the funnel shown in FIG. 3.

DESCRIPTION OF PREFERRED EMBODIMENTS

FIGS. 1 and 2 show a prior-art funnel, designated in toto by the reference numeral 1. In order to prevent dust deposit along angles 2 of the funnel 1 there are provided sheets 3 along each angle 2. The sheet 3 has edges 4 and 5. Each edge is welded to the side walls (6 or 7) of the funnel 1. Obviously, it is very difficult, and sometimes just impossible to polish these welded points. Therefore, the inclination angle $\alpha$ must be decreased in order to prevent dust accumulation along these welded joints. Such a requirement leads to a corresponding increase in the height of the funnel. Obviously, the higher the funnel, the more difficult it will be to transport or assemble the same.

Referring now to the FIGS. 3 and 4, it may be seen that the reference numeral 9 designates in toto a funnel in accordance with the present invention. The funnel 9 includes an upper portion 10 and a lower portion 23.

The upper portion 10 includes two parts 11 and 12. The part 11 has two vertical flanges 13 and 14 which engage the flanges 16 and 15, respectively, of the part 12. The parts 11 and 12 are provided with upper flanges 17 and 19, respectively, and lower flanges 18 and 20. The flanges 17 and 19 are used to support the funnel 9 on a supporting member 21, which may be a bunker arrangement or the like. The funnel 9 may be for example screwed to the member 21. However, any other connection of funnel 9 to the member 21 is possible. On the whole the flanges 17 and 19 reinforce the funnel 9. The funnel 19 is provided at the upper part thereof with a sheet 22, operative to prevent any dust deposit on the upper edge of the flanges 17 and 19 and to facilitate sliding of the dust into the interior of the funnel 9.

The lower portion 23 includes an upper flange 24 operative for connecting to the lower flanges 18 and 20 of the upper portion 10 of the funnel 9. The flange 24 may be for example screwed to the flanges 18 and 20. The lower part 23 has a lower end portion 25 which is provided with a supporting member 26 which has a flange 27.

The parts 11 and 12 of the upper portion 10 are correspondingly bent from a sheet piece, so that the angles are flattened. Such a form makes it possible to avoid any covering sheets (see covering sheets 3 shown in FIGS. 1 and 2). The parts 11 and 12 define instead inclined surfaces 28. Thus the parts 11 and 12 may be made without any welded joints. The only exception is that the flanges 13 through 20 must be welded from outside the interior of of the funnel 9 to the parts 11 and 12.

The lower portion 23 comprises two identical sheet parts 29 and 30 which are welded to each other. The lower portion 23 is also provided with inclined surfaces **31*b* and 31*b*. Such a form renders no problem whatsoever to polish these surfaces. The welded joints 32 and 33 are so arranged as to coincide with the middle of the inclined surfaces 31*a* and 31*b*, which can be very easily polished. The lower end portion 25 is turned relative to the inlet 34 by an angle of 90° so that the length of the side wall of the lower end portion 25 corresponds to the width of the inclined surface 28 and 31 respectively. The outlet 35 of the supporting member 26 is turned relative to the lower end portion 25 by an angle of 90°, so that the outlet 35 is located parallel to the inlet 34 of the upper portion 10. Such an arrangement renders it possible to arrange a plurality of similar funnels 9** one after another defining together a feeding funnel conveyor or the like.

The separate parts 11, 12 and 23 are transported to the assembly site separately. At the assembly site these separate parts are connected (i.e. screwed) to one another. The upper portion 10 is screwed (or otherwise connected) to the supporting member 21. The lower portion 23 is then connected (i.e. screwed) to the upper portion 10. It is also possible first to connect the lower and upper portions to each other and then install the funnel 9 on the supporting member 21 namely insert the funnal 9 either from above downwardly or from below upwardly in the supporting member 21. When the funnel 9 is installed on the supporting member 21 (or below that) the connecting joints between the parts 11, 12 and the portion 23 are welded so as to ensure that these joints are sealingly closed. The small gaps between the connecting parts are filled with light fillets.

It is to be understood that the funnel in accordance with the present invention is considerably less expensive than the prior art funnels. However, this is not the only advantage of the present funnel. The funnel 9 avoids any dust deposit even when the funnel 9 has relatively reduced elongation, which fact ensures continuous flow of dust through the funnel. This is especially advantageous in the case of electro filters since the funnel of the present invention avoids any dust accumulation which may result in plugging the funnel with all negative consequences which can cause for example breakdown of the filter electrodes. On the whole, the funnel of the present invention considerably decreases material consumption, assembly expenses and production cocts of the prior art funnels.

It will be understood that each of the elements described above, or two or more together, may also find a useful application in other types of a funnel differing from the types described above.

While the invention has been illustrated and described as embodied in a funnel, it is not intended to be limited to the details shown, since various modifications and structural changes may be made, without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A funnel for collecting dust from a filter comprising a body having a plurality of walls; said walls being sloped in the vertical direction and connected to each other to form the inlet and the outlet of the funnel, said body including an upper portion and a lower portion, said upper portion including at least two separate parts and being formed with flanges at a lower end thereof, said flanges extending traversally outwardly from each wall forming said upper portion, and said lower section being formed with flanges at its upper end, said flanges extending transversely outwardly from each wall forming said lower portion to meet said flanges of the upper portion, said flanges of said upper portion being screwed to said flanges of said lower portion.

2. A funnel as defined in claim 1, wherein said separate parts are screwed to each other.

3. A funnel as defined in claim 1, wherein said parts and portions are welded together after the same are separably connected to one another to thereby sealingly close the connecting joints between said parts and portions when the same are in assembly with one another.

4. A funnel as defined in claim 1, wherein said upper and lower portions are provided with flattened inclined surfaces extending from the inlet of the funnel and defining an outlet at the lower portion of the funnel.

5. A funnel as defined in claim 4, wherein said outlet has a quadrangular cross-section.

6. A funnel as defined in claim 4, wherein said lower portion has a lower end portion adjacent to said outlet, said lower end portion being turned relative to said inlet by an angle of 90°.

7. A funnel as defined in claim 6, wherein said outlet is turned relative to said lower end portion by an angle of 90°, so that said outlet is parallel to said inlet.

8. A funnel as defined in claim 1, wherein said parts are identical.

9. A funnel as defined in claim 4, wherein said lower portion comprises at least two parts connected to each other.

10. A funnel as defined in claim 9, wherein said parts of said lower portion are identical.

11. A funnel as defined in claim 9, wherein said parts of said lower portion are welded to each other so that the elongation of the welded joints coincides with the middle line of the corresponding sloped wall surface.

12. A funnel as defined in claim 6, wherein each sloped wall surface extends along said lower end portion at the same angle relative to vertical elongation of the funnel.

* * * * *